United States Patent
Oehler

[11] 3,759,192
[45] Sept. 18, 1973

[54] LOAD PALLET CONSTRUCTION
[75] Inventor: Carl W. Oehler, Deerfield Beach, Fla.
[73] Assignee: Oehler Steel Company, Akron, Ohio
[22] Filed: Jan. 28, 1971
[21] Appl. No.: 110,487

[52] U.S. Cl.................... 108/44, 108/51, 214/515
[51] Int. Cl.......................... A47b 23/00, B60p 1/64
[58] Field of Search................. 108/51–58; 214/515

[56] References Cited
UNITED STATES PATENTS

| | | | |
|---|---|---|---|
| 1,832,759 | 11/1931 | Bennett............................ | 108/58 X |
| 1,832,773 | 11/1931 | Hallowell et al................. | 108/58 |
| 1,941,483 | 1/1934 | Moorman........................ | 108/55 |
| 2,934,373 | 4/1960 | Doty................................ | 214/515 |
| 3,002,636 | 10/1961 | Felburn........................... | 214/38 A |
| 3,152,709 | 10/1964 | Fowler............................ | 108/44 X |
| 3,211,313 | 10/1965 | Katz................................ | 214/515 |
| 3,540,385 | 11/1970 | Hobart............................ | 108/58 X |
| 3,592,145 | 7/1971 | Petry............................... | 108/51 |
| 1,715,403 | 6/1929 | Young............................. | 108/51 |
| 2,307,149 | 1/1943 | Mizz et al........................ | 108/51 |
| 3,561,374 | 2/1971 | Honderich...................... | 108/51 |
| 3,606,844 | 9/1971 | Lubker et al................... | 108/58 |

FOREIGN PATENTS OR APPLICATIONS
1,121,291   4/1956   France.............................. 214/515

*Primary Examiner*—Paul H. Gilliam
*Attorney*—Oldham & Oldham

[57] ABSTRACT

A load pallet is constructed of modular sections. The individual modular units are each of box girder construction with the sides of the sections being formed of deeper box girders than the center portions. A number of modular sections are joined together to construct a pallet of the desired length with solid end plates being provided between each of the adjacent sections. The pallets are suitable for any use such as load bearing pallets in a tractor-trailer pallet load carrying assembly.

4 Claims, 4 Drawing Figures

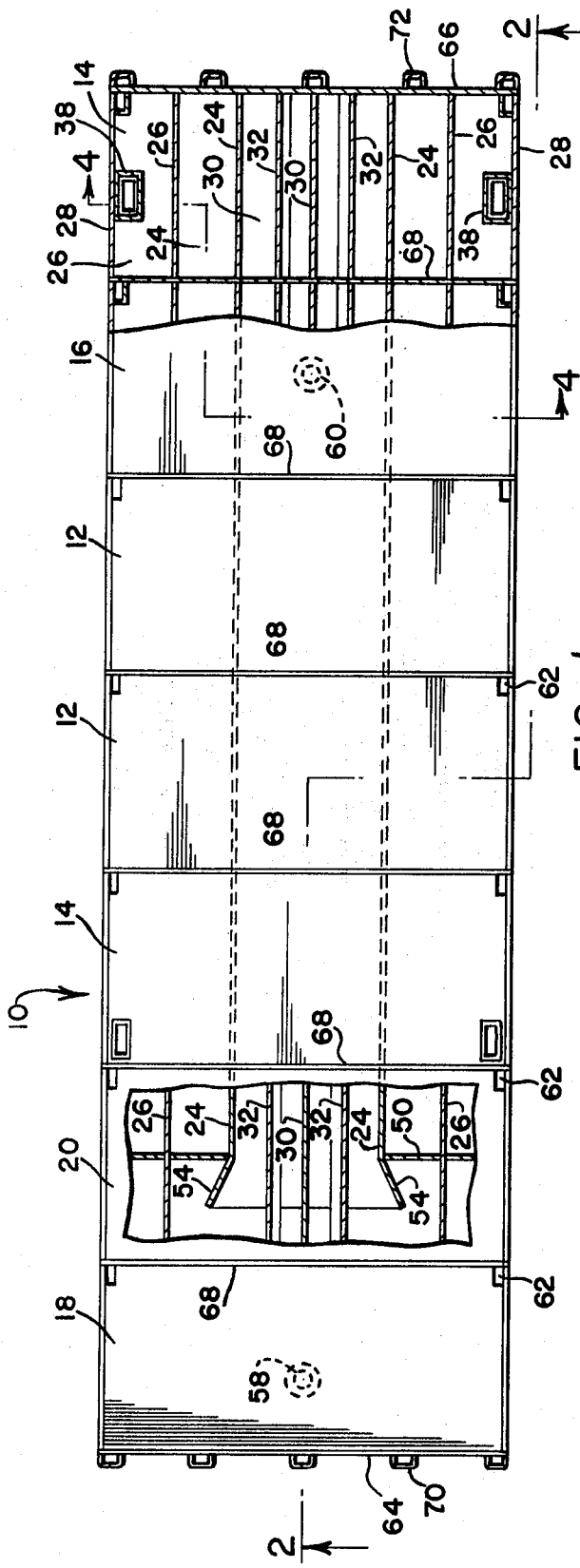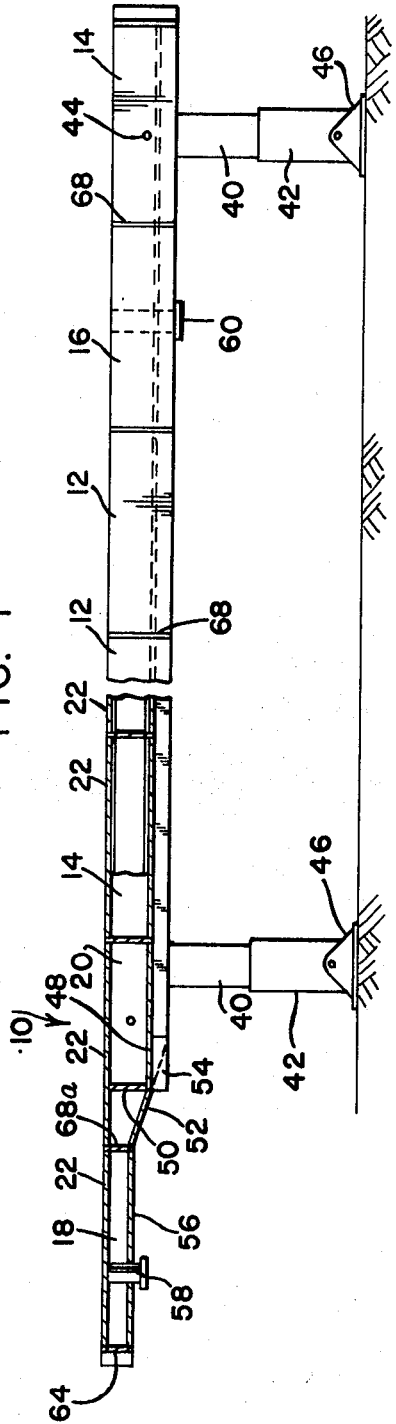

LOAD PALLET CONSTRUCTION

In my application Ser. No. 61,228, filed Aug. 5, 1970, for PALLET TYPE LOAD TRANSPORT APPARATUS, there is disclosed a load handling and transporting system which includes load supporting pallets and a tractor and center pole type trailer combination. The pallets are provided with retractable legs so that the trailer and hitch portion of the tractor may be maneuvered under the pallet. Elevating means are provided on the tractor and trailer pallet engaging means to raise and lower the pallets. In this system, loaded pallets are positioned on the tractor-trailer combination and transported to the desired location. Employing the lifting means of the tractor and trailer hitches or similar means, the loaded pallet is elevated and supported on its legs. The tractor-trailer combination may then be driven from beneath the pallet and is ready to receive another loaded pallet. Thus, the pallets can be used for storage without tying up the tractor-trailer assembly. The arrangement also reduces the amount of handling of the goods.

The present invention is concerned with an improved construction for pallets for use in such systems.

It is the primary object of the present invention to provide a modular pallet construction.

It is also an object of the invention to provide a load supporting pallet which may be constructed more economically than the pallets heretofore available.

A further object of the invention is the provision of a pallet construction system which permits the construction of pallets of different lengths from modular units.

The above and other objects of the invention which will become apparent in the following detailed description are achieved by providing a pallet construction based on a system of modular units which may be welded together to form pallets of various lengths. Each of the modular units is of box girder construction with deeper box girders being employed to form the side portions of each modular unit than the center portion to give the units added strength as well as to provide the guiding channel for the pallet.

For a more complete understanding of the invention and of the objects and advantages thereof, reference should be had to the following detailed description and the accompanying drawings wherein there is shown a preferred embodiment of the invention.

In the drawings:

FIG. 1 is a top plan view of a load supporting pallet constructed in accordance with the principles of the present invention, portions of the top surface of the pallet being broken away to show the internal structure thereof in cross section;

FIG. 2 is a side elevational view of the pallet of FIG. 1, partially in section;

Figure 4:
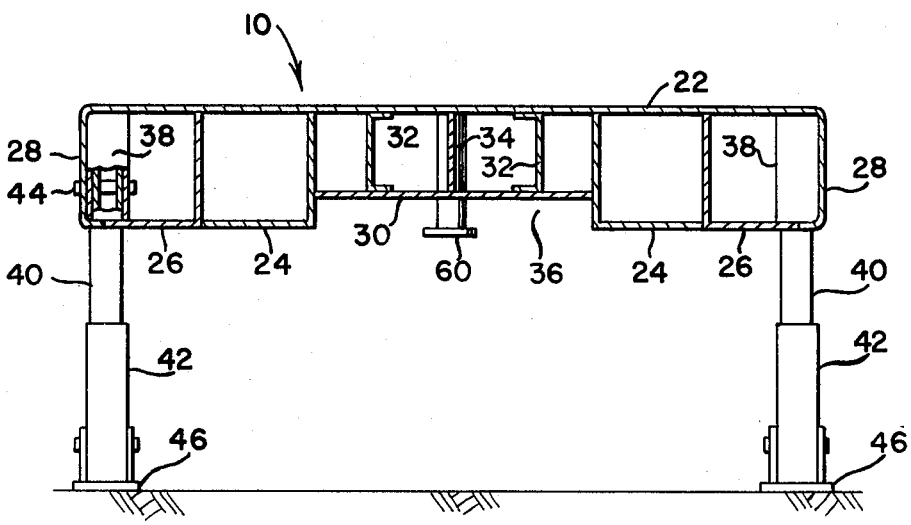
FIG. 4 is a transverse sectional view taken along the line 4—4 of FIG. 1.

The complete pallet is designated by the reference numeral 10 and is formed of a number of modular sections 12 to 20. With the exception of the two front sections 18 and 20, each of the modular sections is of the same basic construction as is illustrated in FIG. 4. Thus, each section has a top plate 22 which covers the entire top surface of the section. Two right angle members 24 and 26 are welded to each other and to the top plate 22 along the side portions of the section with the right angle pieces 24 and 26 extending the full length of the individual section. Side plates 28 may extend between and be welded to the lateral edge of the top plate 22 and the outer lateral edge of the right angle member 26, the plate 28 extending the entire length of the modular section. Preferably the side plates are formed from a single metal plate with the top plate 22 to terminate in inwardly turned bottom flanges 29 to which one edge of the angles 26 are secured. The two legs of the right angle member 24, the vertical leg of the right angle member 26, and the top plate 22 form one box girder running the length of the modular section. Likewise, the two legs of the right angle portion 26, the side plate 28, or equivalent plate, and the top plate 22 form a second box girder which also runs the length of the modular section. This arrangement of two box girder-like members on either side of each modular section imparts high strength to the section while maintaining a lightweight construction. The longitudinal center portion of each of the modular units is formed of a base plate 30, a pair of channels 32 welded to the top plate 22 and the base plate 30, and a vertical plate 34 on the center line of the modular section and also welded to the top plate 22 and bottom plate 30. It will be noted that the channels 32 and the plate 34 are of lesser height than the vertical legs of the angles 24 and 26 so that the base plate 30, which extends between the facing edges of the angle members 24, is positioned above the horizontal leg portions of the angles 24 and 26 thus forming a wide slot or channel 36 extending longitudinally along the center of the bottom surface of the modular section. It should also be noted that the top and bottom plates 22 and 30, respectively, the vertical legs of the angles 24, the channels 32, and the vertical plate 34 define four box girders also running the length of the modular section. This serves to give additional rigidity and load carrying capacity to the modular section and to the pallet constructed with these sections.

Certain of the modular sections 14 may be modified by providing at opposite sides thereof, vertically extending box-like members 38 which are open at at least their lower ends. These open ended box-like members 38 receive the upper portions 40 of the pallet supporting legs. Suitable pins 44 passing through holes in the box-like members 38 and the upper leg portions 40 are provided for securing the legs in their desired positions. The lower ends of the leg portions 40 are telescopically received in the lower leg portions 42. Again, suitable pins or other means, not shown, may be provided to lock the upper and lower leg portions 40 and 42, respectively, together. Each of the legs has a foot member 46 secured to the lower end of the lower leg portion 42.

One of the modular sections 16 is provided with a downwardly projecting king pin 60. This king pin 60 extends downwardly into the groove or recess 36 and is located on the longitudinal center line of the modular section. The king pin 60 serves to provide a connection to the fifth wheel assembly of the trailer.

Figure 3:
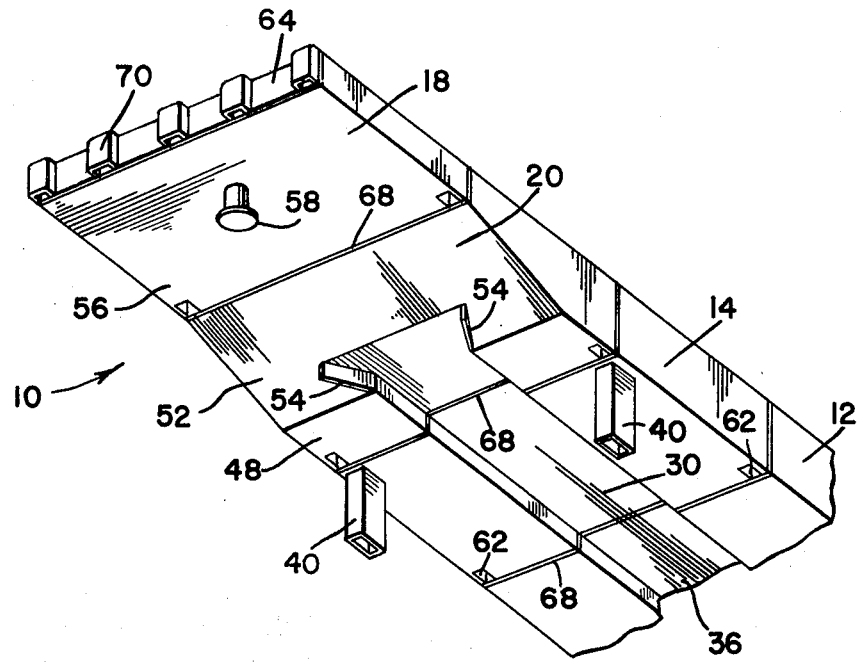
FIG. 3 is a fragmentary perspective view of the underside of the pallet of FIG. 1, viewed from the left front corner thereof.

The two sections 18 and 20 which form the front end of the pallet 10 are of slightly different construction than the remaining sections. As can be seen most clearly from FIGS. 2 and 3, the front most section 18 is of reduced thickness. This section has an upper plate 22 and a lower plate 56 which are joined by suitable side plates or integral edge channels as described hereinbefore. Vertical plates or channels, similar to the plates 34 and channels 32 may be provided in the front section 18 for additional strength, if necessary. A king pin 58 extends downwardly through the section 18 on the longitudinal center line thereof. This king pin connects with the fifth wheel assembly of the tractor. The second modular section 20 has a rear portion which is of identical construction to the modular sections 12. The forward portion of the section 20, however, slopes upwardly on its underside so as to meet the bottom plate 56 of the first modular section 18. Diverging plates 54 are provided at the forward end of the bottom plate of the modular unit 20. These diverging plates 54 serve to provide a funnel-like entrance for the channel 36 which extends longitudinally on the bottom surface of the pallet. The sloping portion of the modular section 20 has a bottom plate 52.

Vertical stake pockets 62 may be provided along the side edges of each of the modular sections 12 to 20. Also, stake pockets 70 may be provided on the front end plate 64 of the first modular panel 18 and stake pockets 72 may be provided on the end plate 62 of the rearmost modular section. It should be noted that while the stake pockets 62 on the sides of the panels are shown as being located within the confines of the panels, these pockets may be positioned externally, if desired. Likewise, the end stake pockets 70 and 72 may be positioned within the confines of the front and rearmost panels, respectively, if desired.

A complete pallet assembly is formed by joining together the various modular sections. A vertical plate 68 is provided between each adjacent modular section, with the plate 68 extending the entire width and height of the section. These plates serve to impart strength and rigidity across the width of the pallet assembly 10. A complete pallet assembly will include one modular front unit 18, a second unit 20, a vertical plate 68a between the first two units 18 and 20, and a series of the basic modular units, with plates 68 between each of the units. These plates 68 are welded to the adjacent ends of the modular sections with the welds extending around the periphery of the plates at each edge thereof. The number of modular units 12 may be varied, as desired, to construct pallets of various lengths. Two of the modular units will be of the type having retractable or equivalent legs 40, 42. In the embodiment illustrated, these units 14 are the third and final units of the pallet assembly. Also, a modular unit 16 having a king pin 60 will be provided near the rear end of the pallet assembly for engagement with the trailer fifth wheel assembly.

It should now be apparent that there has been provided an improved load carrying pallet construction. By the use of the box girder type modular sections, having a channel shape top member, a lightweight but strong assembly is provided. By using a modular arrangement, pallets of varying lengths may be easily constructed, merely by varying the number of modular units employed. Since the modular units are each of the same basic construction, the units may be readily and inexpensively produced.

While, in accordance with the Patent Statutes, only the best known embodiment of the invention has been described and illustrated in detail, it will be understood that the invention is not so limited. Reference should therefore be had to the appended claims in determining the true scope of the invention.

What is claimed is:

1. A load supporting pallet adapted for use with a tractor-trailer combination, comprising:

a plurality of modular sections, each section being of the same widths as the pallet and having a flat top plate extending the length and width of the section and being bent downward along the sides of the modular section forming channel-shaped side edge portions;

a plurality of vertical members each secured to the top plate and extending the length of the section in spaced parallel relation with the channel-shaped side edge portion;

at least one bottom plate secured to the lower ends of the vertical members and extending the length of the modular section, the top plate, bottom plate, vertical members and channel-shaped side edge portions defining box girder members of one depth along opposite sides of the section with a center box girder member of lesser depth therebetween;

a plurality of solid vertical plates extending the width and depth of pairs of adjacent modular sections and secured therebetween to fixedly engage adjacent modular sections, such intermodular engagement allowing the interconnection of modular sections having varying structural and load bearing characteristics;

means for connecting the pallet to the tractor-trailer combination secured to at least one of the modular sections; and supporting legs attached to and depending from certain of the modular sections adjacent the sides thereof.

2. The load bearing pallet as recited in claim 1 wherein one of the modular sections is a connector section and is of greater depth at one of its ends than at the other of its ends, the bottom surface of the section having a sloped bottom plate with an outwardly flared entrance end formed therein aligned with the center box girder member of an adjacent modular section, and wherein a second of the modular sections is at a uniform depth equal to the depth of the box girder member formed between the box girder members along opposite sides of the section, the second of the modular sections forming the front most portion of the pallet and the one of the modular sections forming the next portion of the pallet.

3. A modular section adapted to be joined in end-to-end fashion to similar sections to form a load supporting pallet, comprising:

a flat top plate extending the length and width of the modular section;

a plurality of vertical plates extending the length of the modular section in spaced parallel relation to one another, the vertical plates being secured to the underside of the top plate;

flat bottom plates secured to the lower ends of the vertical plates and covering the underside of the modular section, the top, vertical, and bottom plates forming a plurality of open ended box-like members which extend the length of the modular section;

a rigid vertical member of the same width and depth as the modular section secured to one end of the modular section in a width-wise direction, the rigid vertical member providing means for fixedly interengaging separate modular sections such that the interconnection of modular sections of varying structural and load bearing characteristics may be achieved.

4. The modular section according to claim 3 wherein the modular section is comprised of at least five box-like members, a pair of box-like members on each side of the section being of greater depth than the single box-like member at the center of the section.

* * * * *